US010005205B1

(12) United States Patent
Wicken et al.

(10) Patent No.: US 10,005,205 B1
(45) Date of Patent: Jun. 26, 2018

(54) REFLECTIVE HELIUM-FREE BALLOON SYSTEM

(71) Applicant: Balloon Innovations, Inc., Westminster, CO (US)

(72) Inventors: Christopher J. Wicken, Golden, CO (US); Gregg A. Wicken, Boulder, CO (US)

(73) Assignee: BALLOON INNOVATIONS, INC., Westminster, CO (US)

( * ) Notice: Subject to any disclaimer, the term of this patent is extended or adjusted under 35 U.S.C. 154(b) by 0 days. days.

(21) Appl. No.: 15/178,434

(22) Filed: Jun. 9, 2016

Related U.S. Application Data

(63) Continuation-in-part of application No. 14/853,224, filed on Sep. 14, 2015, which is a continuation of application No. 14/201,665, filed on Mar. 7, 2014, now Pat. No. 9,132,595.

(60) Provisional application No. 61/774,344, filed on Mar. 7, 2013.

(51) Int. Cl.

| B29C 41/04 | (2006.01) |
|---|---|
| B29D 22/04 | (2006.01) |
| B29C 45/14 | (2006.01) |
| B29C 41/46 | (2006.01) |
| B29C 41/42 | (2006.01) |
| A63H 27/10 | (2006.01) |
| B29L 22/02 | (2006.01) |

(52) U.S. Cl.
CPC ........... *B29C 41/042* (2013.01); *A63H 27/10* (2013.01); *B29C 41/42* (2013.01); *B29C 41/46* (2013.01); *B29C 45/1418* (2013.01); *B29D 22/04* (2013.01); *A63H 2027/1025* (2013.01); *B29K 2995/003* (2013.01); *B29K 2995/0029* (2013.01); *B29L 2022/022* (2013.01)

(58) Field of Classification Search
CPC ......... B29C 41/04; B29C 41/44; B29C 41/46; B29C 41/042
USPC ........................................................ 425/328
See application file for complete search history.

(56) References Cited

U.S. PATENT DOCUMENTS

| 262,517 A | 8/1882 | Unz |
|---|---|---|
| 1,527,046 A | 10/1922 | Ingram |
| 1,512,831 A | 10/1924 | Dunnell |
| 1,535,396 A | 4/1925 | Buehler |
| 1,648,338 A | 11/1927 | Gains |
| 1,677,379 A | 7/1928 | Ames |
| 1,782,070 A | 11/1930 | Lazarus |
| 1,788,157 A | 1/1931 | Hogan |
| 2,143,691 A | 4/1938 | Goldberg et al. |
| 2,209,875 A | 7/1940 | Eichelsdoerfer |

(Continued)

FOREIGN PATENT DOCUMENTS

WO 2015195981 A1 12/2015

OTHER PUBLICATIONS

U.S. Appl. No. 14/742,855, filed Jun. 18, 2015, First Inventor: Christopher J. Wicken.

(Continued)

*Primary Examiner* — Joseph S Del Sole
*Assistant Examiner* — Thu Khanh T Nguyen
(74) *Attorney, Agent, or Firm* — Berg Hill Greenleaf & Ruscitti, LLP

(57) ABSTRACT

The current inventive technology described methods and apparatus for the production of a helium-free balloon having customizable reflective features.

14 Claims, 3 Drawing Sheets

(56) References Cited

U.S. PATENT DOCUMENTS

| | | | |
|---|---|---|---|
| 2,488,396 A | 11/1949 | Gottholm | |
| 2,664,667 A | 1/1954 | Burroughs | |
| 2,840,948 A | 7/1958 | Stickley | |
| 2,922,252 A | 1/1960 | Van Dam | |
| 2,924,041 A | 2/1960 | Jackson | |
| 3,150,460 A | 9/1964 | Dees | |
| 3,162,409 A | 12/1964 | Straayer | |
| 3,192,568 A * | 7/1965 | Nicholls | B29C 33/02 249/111 |
| 3,366,999 A | 2/1968 | Darby | |
| 3,439,079 A | 4/1969 | McDowell | |
| 3,721,983 A * | 3/1973 | Sherer | G08B 5/002 116/210 |
| 3,892,081 A | 11/1975 | Goral | |
| 3,920,207 A | 11/1975 | Adamaitis | |
| 4,035,462 A | 7/1977 | Lane, Jr. | |
| 4,589,854 A | 5/1986 | Smith | |
| 4,712,510 A | 12/1987 | Tae-Ho | |
| 4,794,498 A | 12/1988 | Neumeier | |
| 4,895,545 A | 1/1990 | Nelson et al. | |
| 4,953,713 A | 9/1990 | Yaffe | |
| 5,027,992 A | 7/1991 | Murray | |
| 5,036,985 A | 8/1991 | Lovik | |
| 5,052,733 A | 10/1991 | Cheung et al. | |
| 5,127,867 A | 7/1992 | Lau | |
| 5,188,332 A | 2/1993 | Callas | |
| 5,203,530 A | 4/1993 | Liu | |
| 5,234,726 A | 8/1993 | Dahan | |
| 5,282,768 A | 2/1994 | Akman | |
| 5,564,575 A | 10/1996 | Casement | |
| 5,575,470 A | 11/1996 | Sherman | |
| 5,746,461 A | 5/1998 | Broberg | |
| 5,769,474 A | 6/1998 | Moore | |
| 5,823,365 A | 10/1998 | Page | |
| 5,873,764 A | 2/1999 | Scherr | |
| 5,938,255 A | 8/1999 | Rose et al. | |
| 5,944,576 A | 8/1999 | Nelson et al. | |
| 6,176,758 B1 | 1/2001 | Wu | |
| 6,273,479 B1 | 8/2001 | Carlson | |
| 6,422,914 B1 | 7/2002 | Nelson | |
| 6,478,057 B1 | 11/2002 | Bearss et al. | |
| 6,478,651 B1 | 11/2002 | Weir | |
| 6,745,904 B1 | 6/2004 | Komar | |
| 6,923,141 B1 | 8/2005 | Staats | |
| 6,935,268 B1 | 8/2005 | Hawkins | |
| 6,938,871 B1 | 9/2005 | Carlson | |
| 6,969,295 B1 | 11/2005 | Sidwell | |
| D517,123 S | 3/2006 | Sidwell | |
| 7,017,511 B2 | 3/2006 | Fisher | |
| 7,249,991 B1 | 7/2007 | Watson | |
| 7,588,477 B2 | 9/2009 | Sidwell | |
| 7,611,395 B2 | 11/2009 | Bonsembiante | |
| D610,208 S | 2/2010 | Hou | |
| 7,810,265 B2 | 10/2010 | Beatty | |
| 7,854,642 B2 | 12/2010 | Nelson et al. | |
| 7,967,344 B2 | 6/2011 | Herren | |
| 8,152,588 B2 | 4/2012 | Hua | |
| D659,200 S | 5/2012 | Wicken | |
| 8,544,407 B2 | 10/2013 | Spray | |
| 8,789,565 B1 | 7/2014 | Wicken | |
| 8,840,440 B2 | 9/2014 | Pierce | |
| 8,968,047 B1 | 3/2015 | Wicken | |
| 9,087,462 B1 | 7/2015 | Gallus | |
| 9,132,595 B1 | 9/2015 | Wicken et al. | |
| 9,809,784 B2 | 11/2017 | Wang et al. | |
| 2001/0045074 A1 | 11/2001 | Kim | |
| 2003/0071185 A1 | 4/2003 | Casapulla | |
| 2004/0077268 A1 | 4/2004 | Wainhou | |
| 2005/0069661 A1 * | 3/2005 | Yi | B29C 45/00 264/328.1 |
| 2006/0011793 A1 | 1/2006 | Dupuis et al. | |
| 2006/0289707 A1 | 12/2006 | Greenwald et al. | |
| 2006/0292960 A1 | 12/2006 | Muller | |
| 2007/0007424 A1 | 1/2007 | Sifferlin et al. | |
| 2007/0049158 A1 | 3/2007 | Chou | |
| 2007/0218802 A1 | 9/2007 | Gronethal | |
| 2008/0121309 A1 | 5/2008 | Boise et al. | |
| 2008/0166942 A1 | 7/2008 | Hou | |
| 2008/0166943 A1 | 7/2008 | Hou | |
| 2009/0197502 A1 | 8/2009 | Nelson et al. | |
| 2011/0240823 A1 | 10/2011 | Hua | |
| 2011/0253876 A1 | 10/2011 | Odell | |
| 2011/0290171 A1 | 12/2011 | Brick | |
| 2012/0015581 A1 | 1/2012 | Feldstein | |
| 2012/0211614 A1 | 8/2012 | Parello et al. | |
| 2014/0096867 A1 | 4/2014 | Cayton | |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
Amazon: Arizona Balloons; Jan. 24, 2013.
Free Patents Online IP Research & Communities—Rotational Molding; Jan. 24, 2013.
Giant Advertising Balloons; Jan. 24, 2013.
Polyurethane Balloons—Balloon Country; Jan. 24, 2013.
Professional Weather Balloons, 3, 8, and 16 Foot Diameters, Edmund Scientific; Jan. 24, 2013.
Roto-Balloon Printing; Jan. 24, 2013.
Weather Balloons—NovaLynx Corporation; Jan. 24, 2013.
Design U.S. Appl. No. 29/4444,898, filed Feb. 5, 2013, First Inventor: Christopher J. Wicken.
Free Patents Online IP Research & Communities—Rotomolding; Jan. 24, 2013.
International Application No. PCT/US15/036527, filed Jul. 21, 2015, First Inventor: Christopher J. Wicken.
International Application No. PCT/US15/036527, filed Jul. 21, 2015 entitled "Modular Balloon Support". Search Report dated Sep. 30, 2015, 4 pages.
International Application No. PCT/US15/036527, filed Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.
U.S. Appl. No. 14/831,759, filed Aug. 20, 2015, First Inventor: Christopher J. Wicken.
U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.
U.S. Appl. No. 29/444,898, filed Feb. 5, 2013, First Inventor: Christopher J. Wicken. Office Action dated Mar. 18, 2016. 7 pages.
U.S. Appl. No. 15/076,182, filed Mar. 21, 2016, First Inventor: Christopher J. Wicken. Office Action dated Jun. 3, 2016. 8 pages.

* cited by examiner

REFLECTIVE HELIUM-FREE BALLOON SYSTEM

This application is a continuation-in-part of U.S. Continuation application Ser. No. 14/853,224, filed Sep. 14, 2015; which claims benefit and priority to U.S. Nonprovisional application Ser. No. 14/201,665 filed Mar. 7, 2014; which claims benefit and priority to U.S. Provisional Application No. 61/774,344, filed Mar. 7, 2013. The entireties of the aforementioned applications are hereby incorporated by reference.

TECHNICAL FIELD

Generally, the inventive technology disclosed herein relates to improved materials and methods for the manufacture and display of helium-free balloons. More specifically, the inventive technology may involve methods, apparatus, techniques, and systems for the creation of helium-free balloons and display systems that may be used in various commercial, residential or decorative displays. This inventive technology may be particularly suited for helium-free balloons and display systems that are positioned outside commercial establishments to attract attention and/or highlight a specific promotion or event. In certain embodiments, such improved methods involve rotationally casting seamless helium-free balloons. Additional embodiments may involve the use of novel materials, such as poly-urethane (PU) and/or thermoplastic polyurethane (TPU) or even hybrids of the two to create helium-free balloons. Additional embodiments contemplate various internal and/or external support elements which may be adapted to the specific embodiments discussed herein. Still further embodiments may include the introduction of one or more reflective materials into the internal cavity forming a reflective helium-free balloon.

The current inventive technology provides numerous novel and commercially advantageous features including, but not limited to: enhanced durability and product life; 2) increased resistance to deformation resulting from pressure and/or temperature changes as well as tearing; 3) UV and abrasion resistance; 4) decreased weight and material use; 5) improved aesthetic appearance; and 6) customizable reflective and/or color features.

BACKGROUND OF THE INVENTION

Traditional helium filled balloons, whether used as novelties or displays, have been around for well over a century. Such traditional helium-filled balloons are generally made from latex or Mylar, however, these materials are limiting. For example, latex oxidizes quickly losing its elastic quality becoming brittle and deformed. In addition, latex poses a problem as it is a serious allergen for many people. Mylar, on the other hand quickly loses helium across its thin surface membrane limiting its ability to remain aloft for any significant amount of time.

Perhaps most limiting on such traditional balloons is the scarcity and expense of available helium. For example, the U.S. alone produces 75 percent of the world's helium. However, a lack of private sector helium producers, federal regulations and decline in U.S. Federal Helium Reserves have resulted in significant price increases and dwindling supplies of commercially available helium. Much of the available helium gas is currently being diverted to industrial and/or medical uses, such as MRI's, cryogenic preservation as well as scientific applications such as particle accelerators. Under these conditions, it is simply not cost effective to continue production of helium-dependent balloons.

Apart from these cost concerns, traditional helium based balloons also exhibit several functional disadvantages. First, helium is the second lightest element making it significantly lighter than air. While this imparts the typical "floating" characteristic of helium balloons, the helium is also known to be a very active gas, i.e. exhibits a high degree of Brownian atomic movement. As a result of helium's small size and high activity, traditional helium balloons rapidly lose their chemical equilibrium as the helium contained within the body of the balloon passes through the balloon membrane to the external environment. This results in a sagging appearance as well as the all too familiar "sinking" as the lighter than air helium escapes into the surrounding air. While a thicker membrane would slow this process, the additional weight would overcome the loft provided by the lighter-than-air helium rendering this option ultimately ineffective. The limitations have rendered helium-based balloons and display systems inefficient and uneconomic.

To overcome these limitations, helium-free balloon systems have been developed in recent years. However, such systems are also limited in several significant ways. The most obvious problem with such helium-free or "air-only" balloons is that they are not lighter than air and must rely on external supports or attachments to achieve the distinctive appearance common to helium-based balloons. Such helium-free balloon systems may also be limited by traditional materials. For example, traditional helium-free balloons may be made from polyvinyl chloride (PVC). However, PVC balloons possess several draw-backs limiting their commercial usefulness. First, PVC is a source of phthalates which are known to be toxic and further cannot easily be recycled. In addition, in cold weather PVC helium-free balloons become brittle, less elastic and deformed.

Traditional manufacturing methods and materials for such helium-free balloons may also have significant limits to their practical and economic potential. Typically, traditional helium free balloons are formed from disparate pieces of shaped plastic or PVC being placed together and physically sealed. Such material surfaces cannot be too thick or they may be prohibitively heavy and/or expensive and cannot be efficiently supported by external displays. Nor can these material surfaces be too thin or they will be prohibitively fragile and will not effectively hold pressurized air. Regardless of the final thickness, the resulting seams provide structural weakpoints which are prone to tear, as well as allow pressurized gas to more rapidly escape resulting in unwanted sagging and deflation. Moreover, pressure differences between the high-pressure air inside a traditional helium-free balloons and the external environment may be especially pronounced during temperature changes, such as occur at night when the internal air pressure decreases, again resulting in unwanted sagging and deflation.

In addition, traditional seamed construction processes may also result in an unacceptably high defect rate. For example, it is currently estimated within the industry that as many as 5% of all traditional "seam" constructed helium-free balloons exhibit some type of manufacturing defect. Such defective products are difficult and costly to detect prior to any final end-user sale resulting in a significant waste of time, effort and resources. Traditional seamed structures are also limited by size. Naturally the larger the helium-free balloon, the larger the total surface area of the seam portions along its surface. This increased seam surface area not only increases the rate of manufacturing defects and therefore cost, but exaggerates the air-pressure loss and temperature-based fluctuations described above. Again, this deflation effect is more pronounced in cold weather conditions. As such, there is a need for a single comprehensive solution to the limitations described above.

SUMMARY OF INVENTION

It is the object of the present invention to provide a seamless helium-free balloon system to address the comprehensive concerns outlined above. Additional objects of the current invention may also be to provide: 1) a seamless or seamed helium-free balloon made from PU or TPU; 2) a robust helium-free balloon that may retain a desired internal pressure for an extended period of time, if not indefinitely; 3) novel and unique manufacturing techniques and materials that may produce a helium-free balloon that overcomes the above referenced limitations; 4) a helium-free balloon that may be larger than traditional seamed helium-free balloons; 5) a helium free balloon that may be lightweight and easily adaptable to, and supported by external support display devices; 6) a helium-free balloon that may be significantly stronger and more durable than traditional helium-free balloons; 7) a low-cost helium-free balloon; 8) a helium-free balloon external display support; 9) a helium-free balloon having an integral external display support attachment; and 10) a helium-free balloon that may retain constant, or near constant internal pressure across various temperatures; and 11) helium-free balloons incorporating customizable reflective and/or color features.

Accordingly, the objects of the methods and apparatus described herein address each of the aforementioned problems and goals in a practical manner. Naturally, further objects of the inventive technology will become apparent from the description and drawings below.

DETAILED DESCRIPTION OF THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 2:
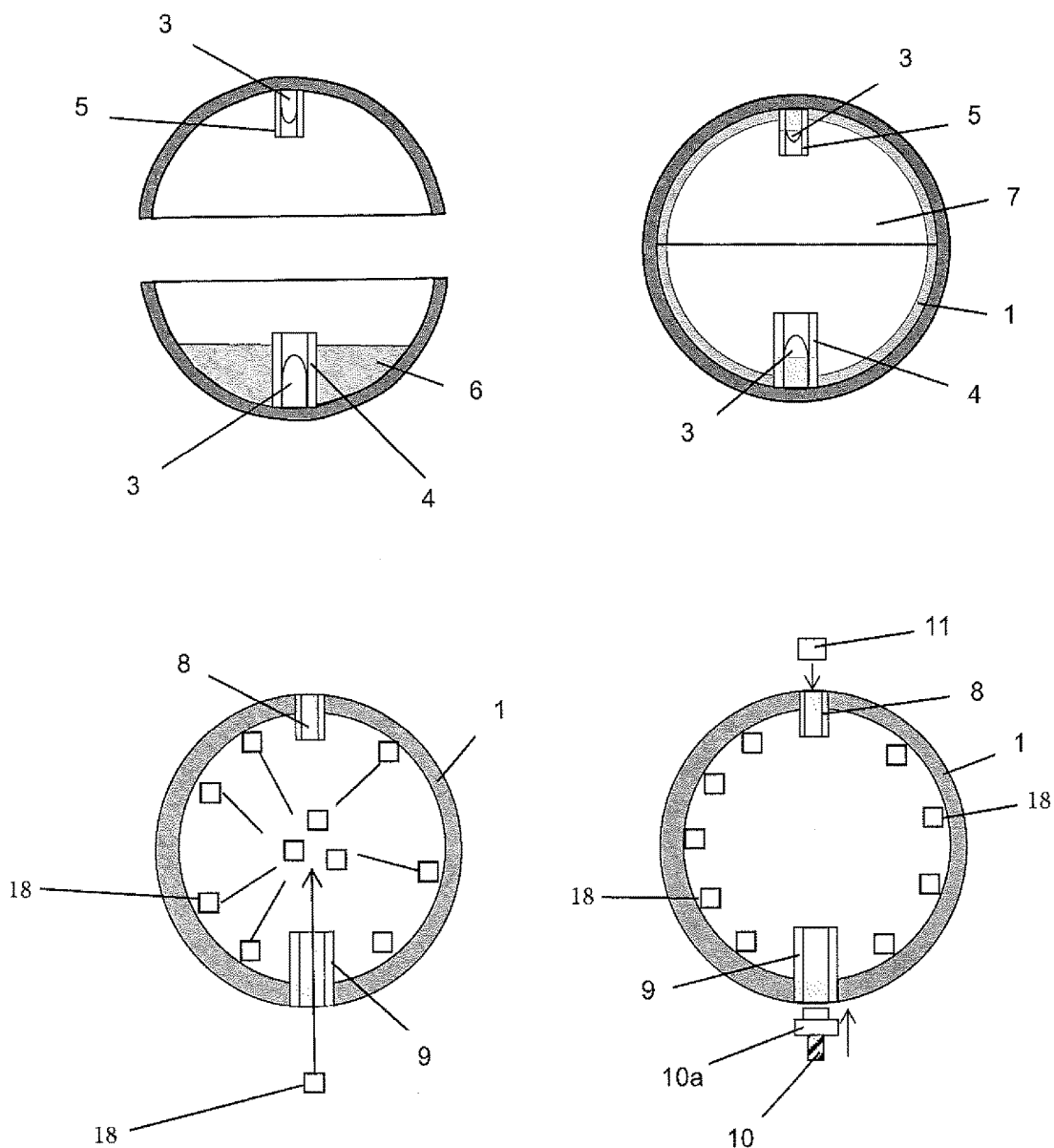
FIG. 2: a step-wise diagram of the rotational-molding of a seamless helium-free balloon as well as the introduction of a reflective material into the balloons internal cavity in one embodiment thereof.
Figure 3:
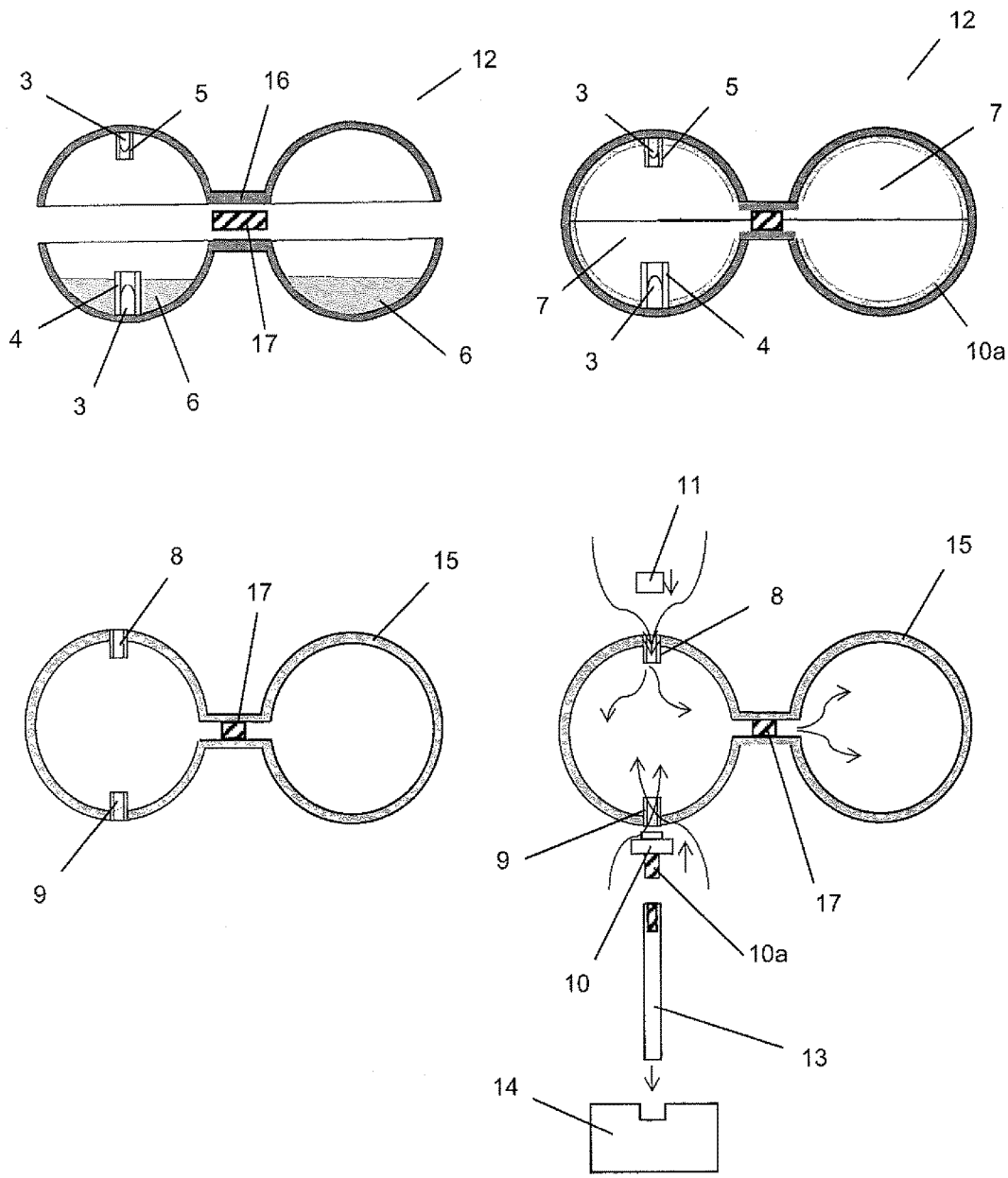
FIG. 3: a step-wise diagram of the rotational-molding of a seamless helium-free balloon with exemplary external attachment and mount in one embodiment thereof.

Referring now to FIG. 2, in certain embodiments the above referenced principles of rotational molding may be used to manufacture a seamless helium-free balloon (1). In this embodiment, a rotational mold may be created with the desired size and shape of the eventual balloon. As shown in FIG. 3, as will be discussed below, additional embodiments may include multi-chambered seamless balloon rotational molds (12) where entire seamless helium-free balloon clusters having a plurality of balloons may be created. In addition, internal elements may be included in the mold. Such internal elements may include internal supports, as well as perhaps color or design elements.

Figure 1:
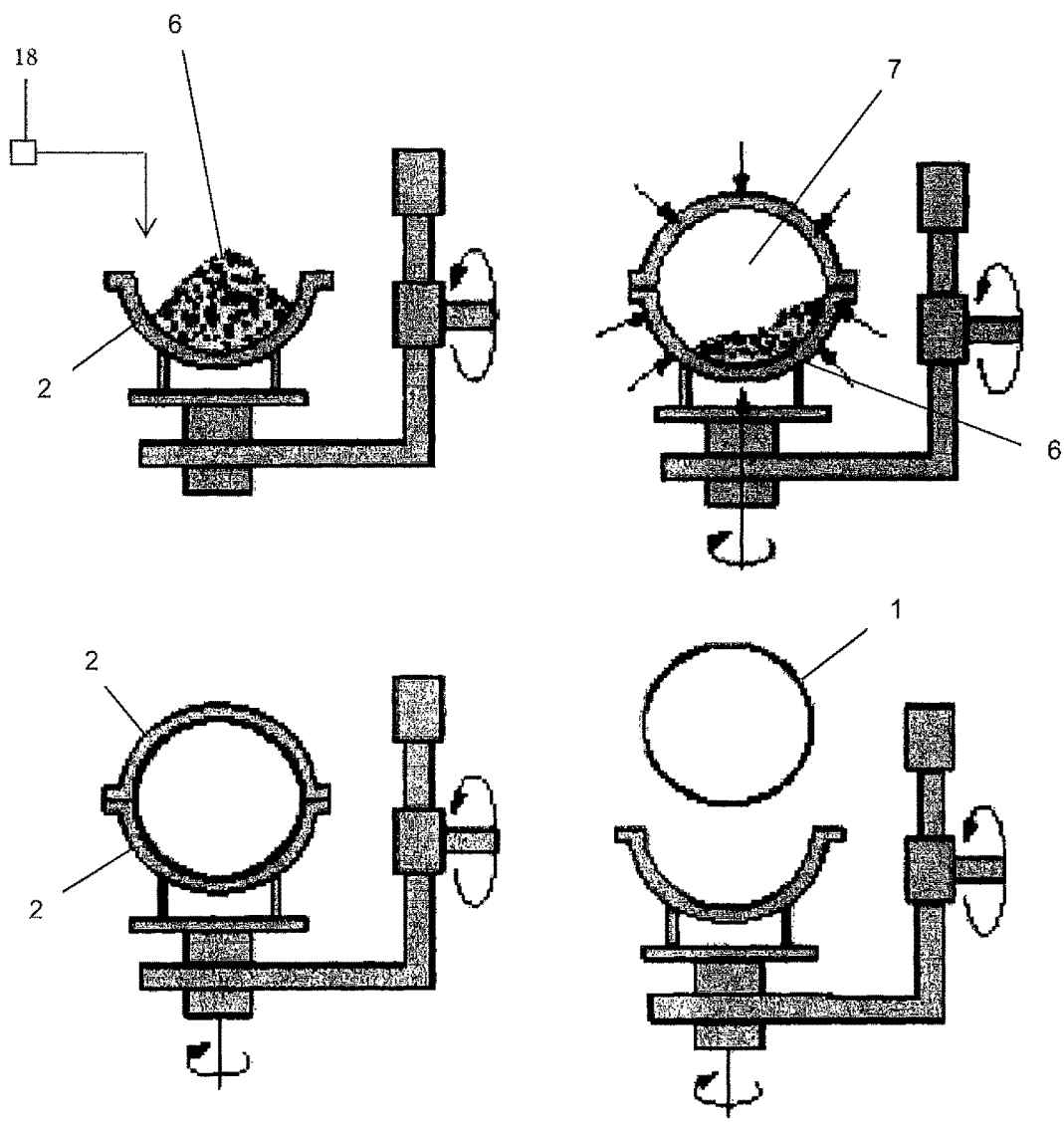
FIG. 1: a general diagram of a rotational molding apparatus in one embodiment thereof.

Specifically, in one embodiment rotational molding techniques may be employed to manufacture a seamless helium-free balloon (1) or seamless helium-free balloon component (1). As generally shown in FIG. 1, rotational molding may be used to produce hollow articles of manufacture which are suitable for a variety of applications. For example, to rotationally mold an article having a desired configuration, a suitable molding material (6), in this illustration a powder, may be introduced into the interior cavity of the rotational mold, which may then be closed and rotated about one or even two axes inside a heated environment, which may allow, in this example the powder to melt and be distributed along the interior cavity of the rotational mold, forming a hollow article as defined by the mold. Such a heating step may typically be accomplished in a closed oven or other heated environment. The mold may then be removed from the heated environmental, such as an oven to cool. The mold may, in some embodiments be quenched to dissipate any residual heat and perhaps set the molded material (6) into the desired configuration. Once cooled the resulting article may be removed from the mold. In this embodiment, a seamless helium-free balloon (1), having all of the physical and economic advantages described above, may be manufactured. It should be noted however, that in some instances, such as with certain liquid molding materials, as well as with methods of catalytically enhanced solidification, such heating and quenching steps may not be necessary.

As described in FIGS. 1-3, in a preferred embodiment, the inventive technology discloses a method of fabricating an externally supported seamless balloon display. This method may include the steps of generating at least one seamless balloon rotational mold (2) having at least one extension (3) securing at least one internally positioned air insert valve housing (5) as well as perhaps another extension (3) securing at least one internally positioned external support housing (4). A quantity of molding material (6) may be inserted, manually, automatically or perhaps through an injection process, into said rotational mold (2). The rotational mold (2) may be sealed forming an internal cavity (7) that may ultimately describe the general or desired shape of the seamless helium-free balloon (1). While a round shape is generally described in FIGS. 1-3, many embodiments are contemplated within the scope of the inventions, including, but not limited to: an oblong seamless balloon rotational mold; an angular seamless balloon rotational mold; a curvilinear seamless balloon rotational mold; an angled seamless balloon rotational mold; a seamless balloon rotational mold having one or more depression elements; a seamless balloon rotational mold having one or more bubbling elements; a seamless balloon rotational mold having one or more protrusion elements; a seamless balloon rotational mold having one or more kiss-offs elements; a seamless balloon rotational mold having one or more almost kiss-offs elements; a ribbed seamless balloon rotational mold; and a tear-drop seamless balloon rotational mold. Additional embodiments may include the placement of plastic inlay designs onto the internal cavity of said rotational mold (2). Such inlay designs may be made of chemicals and/or materials that may transfer to the external surface of the balloon component (1) so as to form designs along the seamless surface. It should be noted that such designs may be added later post-molding to the surface of the balloon component. In additional embodiments multiple molding materials and or colors may be used to form hybrid seamless helium-free balloon components (1).

Again, referring to FIGS. 1-3, the rotational mold (2) may be heated sufficiently to cause the molding material (6) to become viscous. This viscous molding material (6) may then be distributed across said internal cavity (7) of said rotational mold by rotation or movement of the rotational mold (2). The distributed molding material (6) may then adhere to the internal cavity of the rotational mold's internal cavity (7). The heated molding material (6) may also adhere to an internally positioned air insert valve housing (5) and/or an internally positioned external support housing (4). Once the heated molding material has been sufficiently distributed, and adhered to the various element herein described, the rotational mold (2) may be quenched so as to allow the distributed molding material to solidify forming a seamless balloon component (1). The rotational mold (2) may be separated from the seamless balloon component (1) such that the distributed molding material has adhered with internally positioned air insert valve housing (5) and/or an internally positioned external support housing (4) forming and integral air insert valve housing (8) and an integral external support housing (9). It should be noted that the term integral, may typically mean that one or more disparate elements have been joined, whether directly and/or indirectly for a substantially singular element.

Referring again to FIGS. 2-3, in a preferred embodiment an external support (10) may be manually or automatically inserted into said integral external support housing (9). In some embodiments the seamless balloon component (1) may be inflated, manually or automatically utilizing, for example compressed air. In one exemplary embodiment seamless balloon component (1) may be inflated to a desired size through an integral air insert valve housing (8). To prevent air loss, as shown in FIG. 2, a plug (11) may be inserted and/or secured in said integral air insert valve housing (8). As will be detailed below, this seamless balloon component (1) may be coordinated with external support elements and displayed in such a fashion as to provide the appearance of being a lighter-than-air helium balloon.

As can be appreciated, once an appropriate rotational mold (2) has been established, a variety of molding materials (6) may be chosen and distributed into the open mold. Such molding materials (6) may be in a solid, powdered or liquid form and may include, but may not be limited to: elastomeric molding material; plastic molding material; polyurethane (PU) molding material; thermoplastic polyurethane molding material; low-density polyethylene molding material; linear- and/or low-density polyethylene molding material, and high-density polyethylene molding material; cross linked grades of polyethylene molding material; ethylene vinyl acetate molding material; plasticine molding material; adhesive-type polyethylene molding material; polyvinyl chloride molding material; nylon molding material; polycarbonate molding material; polyester molding material; polypropylene molding material; or any hybrid of the same in varying percentages.

It should be noted that as shown in FIG. 2, an exemplary rotational mold (2) may be constructed to hold at least one internally positioned air insert valve housing (5) and/or at least one internally positioned external support housing (4). This housing may form a secure connection over this valve holder element or extension (3). This secure connection may be a liquid tight seal configuration such that the balloon material inserted into the mold, whether initially liquid or powder, may not leak into or cover the housing's aperture. This valve holder element or extension (3) may be tapered or have a defined ridge at the end to allow the heated insert material to cover the length of a housing securing it in the internal space of the formed balloon without covering the housing aperture or disrupting the continuous balloon surface. In some embodiments, an internally positioned air insert valve housing (5) and/or an internally positioned external support housing (4) may be set-off from the interior cavity (7) of the rotational mold (2) to allow perhaps the full distribution of molding material (6) along the interior cavity such that one or more housings are internally positioned and continuous with the balloon surface forming a seamless component.

Again as shown in exemplary FIGS. 1 and 2, the internally positioned air insert valve housing (5) and/or internally positioned external support housing (4) may be a small circular element, perhaps made of hard plastic or other appropriate material. In a preferred embodiment, a housing may be formed of a non-elastomeric material or composite or even a hybrid of materials having different properties. In other embodiments such housing may be formed by extrusion processes and cut to a desired dimension. Such housings may be formed from a material that may have sufficient heat tolerance, or high melting point, so as to maintain its structural integrity during the heated stages of the rotational molding process, while in other embodiments such housing may have sufficient heat tolerance, or low melting point properties, so as to physically and/or chemically adhere to the molded material. As noted above, in some embodiments, during the heating stage these housings may become chemically and/or physically connected with the molding material (6) so as to be integral one with another forming perhaps an air-tight seal.

As noted above, in certain embodiments molding material (6) may be adhered with said internally positioned air insert valve housing (5) and said internally positioned external support housing (4). Such adherence may encompass adhering the molding material to the surface of a housing, while other embodiments may encompass adhering the molding material through perforations in said internally positioned air insert valve housing and said internally positioned external support housing. Additional embodiments may encompass adhering the molding material through extensions in said internally positioned air insert valve housing and said internally positioned external support housing, while still further may encompass adhering the molding material through adhering said heated molding material through at least one integral channel in said internally positioned air insert valve housing and said internally positioned external support housing. In this last embodiment, viscous molding material may enter through an internal channel in a housing, which may be continuous or non-continuous and solidity forming an internal adherence.

Again referring to FIG. 2-3, as noted, in some embodiments the extensions (3) that may secure an internally positioned air insert valve housing (5) and said internally positioned external support housing (4) may be tapered. In some embodiments such extensions (3) may be integral with the rotational mold (2). In further embodiments such extensions (3) may be adjustable and may further be interchangeable and/or securable through a locking element, such as an extension lock, a snap lock, a slide lock, a pressure lock; a bracket lock; and a snap lock.

As noted in FIGS. 2-3, the housings depicted may be a round continuous form, however in certain additional embodiments such housings (4, 5) may have external ridges which may help secure and adhere such housings to said molding material. These external ridge elements may assist in forming a tight seal and to prevent unwanted sheer or pull forces which may be present in external environments caused perhaps by wind or other external "pulling" forces. In other embodiments such housings may be threaded, either internally or externally. Such threading may, as discussed below aid in securing additional secondary elements such as plugs, valves and/or external supports which may also be threaded. Such housings (4, 5) may also be capped and/or tapered, or even be secured to an aperture cover such that during the rotational molding process, for example molding material (2) does not seep through the external opening and onto the extension.

It should also be noted that both housings (4,5) may both be terminally and/or proximally flared. Such flaring may provide certain structural benefits. For example a terminal housing flare may form a continuous surface of the internal cavity of the rotational mold helping to form a continuous seal with said molding material, while a proximal flare may act as a block against sheer and/or pulling forces exerted on one or more housings. Such housing may also be connected with or internal support design elements such as shapes, or other promotional elements that provide a distinct look and/or internal shadowing effect.

As discussed, in certain embodiments, one or both housings (4,5) may form a passage into the internal space of the balloon component such that pressurized gas may be inserted to cause inflation. It should be noted that these housings (4,5) may, in some embodiments be a valve element which may be used to inflate and/or deflate the balloon component. In this application a valve may include but not be limited to: a one way valve; a two way; a needle valve; a manual inflation valve; and a compressed air inflation valve.

Additional embodiments may include a secondary element that may be inserted and/or secured into one or more housings (4,5). Again referring to FIGS. 2 and 3, in certain embodiments a plug (11) inserted and/or secured into said integral air insert valve housing. In certain embodiments, such plug element may include a fitted plug element, such as one having a flared, and or expanded region, such that it may be more securely positioned into, for example an integral air insert valve housing (8). Embodiments of such fitted plugs may include, but not be limited to: threaded plug; a puncture plug slide locking plug with protrusions that may correspond to channels or depressions and or perforations in a housing; a slotted plug; a barbed plug; a externally ridged plug; and a beveled plug.

In certain embodiments, this plug may be a valve element. Again, such a valve may be a fitted valve element to better assure proper securement with said integral air insert valve housing (8) or other integral housing. For example, in one method of the invention a fitted valve element may be secured in an integral air insert valve housing. Alternative embodied steps may include, but are not limited to: securing at least one threaded valve into said integral air insert valve housing which may also be threaded; securing at least one fitted valve into said integral air insert valve housing; securing at least one beveled valve into said integral air insert valve housing plug; securing at least one puncture valve into said integral air insert valve housing, such puncture element penetrating for example a capped housing, or any residual layer of distributed molding material; securing at least one externally ridged valve into said integral air insert valve housing plug; securing at least one barbed valve into said integral air insert valve housing plug; securing at least one slotted valve into said integral air insert valve housing, where such slots may correspond to depressions and or holes in an integral housing to form a secure interlocking bond; and securing at least one slide locking valve into said integral air insert valve housing with protrusions that may correspond to channels or depressions and or perforations in a housing.

Referring again to FIGS. 2-3, in some embodiments an external support (10) may be inserted and/or secured in integral external support housing (4) or other housing. In one exemplary embodiment, such external support (10) may comprise a plug and/or even a fitted plug element. Examples of such may include, for example a threaded plug which, again may be threaded into said integral external support housing (4); an externally ridged plug; a slotted plug; a barbed plug; a slide locking plug; and a beveled plug. Such fitted plug elements may, similar to the description allow for a tight seal and to prevent unwanted sheer or pull forces which may be present in external environments caused perhaps by wind or other external "pulling" forces. As can be naturally appreciated, another advantage of this configuration may overcome the deformation caused by temperature fluctuations. For example, as noted above, traditional helium-free balloons are susceptible to pressure changes caused by temperature fluctuations. However, as noted above, the invention's valve holder may be formed from a hard plastic or other thermo-resistant material that may not be deformed at high or low temperatures. As such, this rigid valve holder may allow the inventive helium-free to remain in a desired position despite temperature fluctuations.

In some embodiments this external support (10) may also include a display attachment element. Returning again to FIG. 3, this display attachment element may include a rod attachment element (10a). In this exemplary depiction this rod attachment element (10a) may include a threaded region which may allow it to be threaded, fitted or otherwise secured to an external display attachment element (13) such as a rigid or pliant rod or other extender, or perhaps to additional display attachment elements forming a helium-free balloon cluster. For example, external support (10) may be an external multi-balloon display attachment such that it may be coordinated with multiple seamless helium-free balloon elements in a single or multiple display.

As described in FIG. 3, external display attachment (13) or an external support (10) may be secured with at least one external mount (14). Such external mounts my assist in the display of said helium-free balloons, for example by producing the appearance of lighter-then-air suspension. Embodiments of such mounts may include, but are not limited to: a surface mount; a glass mount; a magnetized mount; a hose attachment; a ground stake; a weighted mount; a suction mount; a slide mount; a clamp mount; and/or a window mount.

In one alternative embodiment, integral and/or non-integral external support attachment tabs may be formed through the rotational molding process. In a preferred embodiment, continuous shaped planar extractions in the rotational mold may form a secondary internal cavity within the rotational mold (2) such that the molding material (6) is distributed into said secondary internal cavity forming a continuous extendable flap element integral with the seamless balloon component. Such integral external support attachment tabs may be secured to an external display attachment (13), an external support (10) or even an external mount (14) forming a primary and/or even secondary reinforcing attachment between the balloon component and any external mounting system. In a preferred embodiment, one or more integral external support attachment tabs may be looped around and secured to external display attachment which may a mounting cup, having perhaps hooks or protrusion to secure the attachment tabs coordinated with a pliant extension rod that may be further coordinated with an external mount (14), such as a weighed mount. Such integral external support attachment tabs may be configured to utilize the elasticity of the balloon material forming a pressured fit with said external mounting system, or secured with a securement element, such as a tie, loop, or penetrating extension.

As described in FIG. 3, in another exemplary embodiment, the inventive technology may fabricate a plurality of continuous seamless helium-free balloons (15). In this embodiment a multi-chambered rotational mold may be generated similar to the methods described above. In this case, for example one or more internal cross support housings (16) may be positioned between each rotational mold chamber. As the molding material is distributed across said internal cavity of said rotational mold, an internal cross support housing (16) may be secured within said balloon component forming an integral cross support housing (17) similar to the housings described above. Such an integral cross support housing (17) may provide a ridged support to prevent expansion of the connecting balloon compartment which might otherwise inflate causing the shape of the balloon components to warp. In additional embodiment, integral cross support housing (17) may contain at least one extension securing at least one internally positioned air insert valve housing; and at least one extension securing at least one internally positioned external support housing allowing for a centralized inflation and/or external support coordination.

Additional embodiments of the current inventive technology may include the manufacture of a helium-free balloon, with or without seams, utilizing PU or TPU. As noted above, existing materials used for helium-free balloons are inadequate. Novel and unique materials are needed to fully realize the potential of helium-free balloon systems. As noted, PU and TPU may be used to create seamed and or seamless helium-free balloons using rotational molding or thermal welding techniques among others.

PU and TPU (generally referred to as PU) may impart several advantages to helium-free balloons. For example, at a chemical level PU is a polymer composed of a chain of organic units joined by urethane links. This may allow for stronger and more durable chemical bonds which in turn may allow for a more durable helium-free balloon. Indeed, based on this unique chemical structure, a helium-free balloon may be formed having a thinner membrane than traditional helium-free balloons, yet may be stronger and more resistant to abrasion. An additional benefit of having a lighter helium-free balloon, aside from the cost savings in materials needed and shipping, may include an improved visibility profile. In a preferred embodiment, a PU helium-free balloon, or balloon cluster may be secured to an external support (10), or external support attachment (14) such as an extended rod. This extended rod may typically be formed from fiberglass, metal, plastic or other composite materials. Such a display system may be secured to an external mount (14) such as weighted stand, or perhaps staked into the ground outside a commercial establishment to generate consumer attention. PU helium-free balloons, being typically lighter, may have greater lateral movement eliciting increased attraction by potential consumers.

In addition, with this increased lateral movement, having a lighter helium-free balloon or even balloon cluster may reduce stress on any attached external display attachment (13), such as an extended rod. As can naturally be appreciated, a heavier PVC helium-free balloon supported by an extended rod may become overly stressed, for example, due to excessive bending as a result of wind or human action. This reduced leverage weight/force on any mounting tether point may reduce instances of product failure. For example, an exemplary helium-free balloon cluster formed with approximately 6 helium-free balloons each weighing 0.25 pounds may generally be supported by a fiberglass extended rod without a risk of failure. However, increasing the size of the balloons by a factor of 2 or 3 would likely require use of a metal extended rod to prevent failure, in for example, windy conditions.

Additionally, despite having perhaps a thinner membrane, pressurized gas may not cross a PU membrane as easily as traditional helium-free balloons and, as such, the current invention may retain a desired internal pressure for an extended period of time, if not indefinitely. One advantage of this is that such a helium-free balloon may not require additional or continuing inflation. Such advantages are maintained despite changes in temperature which may allow the invention to retain its original or desired shape across a spectrum of temperatures and climates. As such, the invention may allow the current inventive technology to be used year-round even in cold climate regions. Additional chemical properties may include improved resistance to UV radiation as well acidic conditions such as those caused by acid rain and other environmental pollutants.

In a preferred embodiment, the current invention may include steps for fabricating a helium-free polyurethane (PU) and/or thermoplastic polyurethane (TPU) balloon. In this embodiment a PU and or TPU film may be cut to form individual balloon shape elements, the shape and size depending on the desired shape and size of the final helium-free balloon. These individual balloon shape elements maybe stacked so as to form a desired seam line. A thermal compression die shape shaped to correspond to a desired seam line may be heated and compressed onto the desired seam line. In one embodiment this compression die may be maintained at a specific temperature, while in a preferred embodiment, it is maintained at a substantially un-heated condition until after is it compressed into a desired seam line. After it has compressed the seam line, it may be temporarily heated, perhaps through an electrical current to a temperature sufficient to melt said PU and/or TPU balloon shape elements. In a preferred embodiment, the thermal compression die may be cooled while maintaining contact with said individual PU and/or TPU balloon shape elements and then removed after the seam line is substantially fused forming a single thermal welded PU and/or TPU balloon shape element. This process may be repeated to form the desired PU and/or TPU balloon shape. It should be noted that the compression die may be removed prior to it being cooled. In addition, prior to thermal welding an interposer material, such as silicon and/or Teflon may be added to the seam line to protect the PU and/or TPU balloon shape elements against excessive heat and scorching.

In still further embodiments, a plurality of apertures may be generated in at least one of said individual PU and/or TPU balloon shape elements. An air fill regulator, such as a plug and/or valve and/or an external support housing may be inserted and/or secured into one or more of said apertures, perhaps with an attachment border to provide a thermal welding seam position with the balloon components. After the balloon elements have been thermal welded into the desired shape, an external support may be secured into the external support housing. In still further embodiment, one or more PU and/or TPU external support attachment tabs may be thermal welded to the balloon which may further be secured to, for example an external mount or other external display attachment.

Referring to FIG. 2, in one preferred embodiment, a helium-free balloon may be formed using a translucent material. In a preferred embodiment, this translucent material may include any suitable material that may be used to form a helium-free balloon. Such translucent material may include generally fully transparent, as well as semi-transparent material. In a preferred embodiment, this translucent material may be colorless or white—however various colors may be used. Again referring to FIG. 2, in one embodiment one or more reflective materials (18) may be injected into a helium-free balloon (1), which may or may not be internally seamless. In this embodiment, the reflective material (18) may adhere to the internal surface of the helium-free balloon (1), which may be sufficiently viscous to hold the reflective material (18) generally in place, and further be visible through the translucent material. In some embodiments, the internal surface of the helium-free balloon (1) may be electrostatically charged so as to adhere the reflective material (18) through static attraction. Additional embodiments, may include the use of adhesives to coat the internal surface of the helium-free balloon (1) so as to adhere the reflective material (18). In this preferred embodiment, the presence of the adhered reflective material (18) may be visible through the translucent material and further provide color, as well as a visible reflective attractant to the helium-free balloon (1) increasing its ability to be noticed by consumers.

In one preferred embodiment, a quantity of one or more reflective materials (18) may be injected into a helium-free balloon (1) through an external opening or aperture. In this preferred embodiment, one or more reflective materials (18) may be injected, or placed inside of a helium-free balloon (1) through an external opening. In some embodiments, this external opening may integrally positioned, and be formed through, for example, a rotational molding process. Embodiments of this may include at least one internally positioned external support housing (4), and/or at least one internally positioned air insert valve housing (5). Additional examples may be include an opening in a helium-free balloon created during, or after a rotational molding or thermal welding process, such as through an extension in the rotational mold (2), as well as integral, and/or non-integral valves.

Again referring to FIG. 1, in certain embodiments reflective material (18) injected into the internal cavity of a helium-free balloon may include a variety of reflective, or semi-reflective and/or colored material. Examples of such reflective materials may include, but not be limited to: reflective plastic; glitter; reflective copolymer plastics, aluminum foil, Mylar, titanium dioxide coated plastic, iron oxide coated plastic; titanium dioxide coated composite, iron oxide coated composite; colored powder; reflective dyes; powder dyes; and/or liquid dyes. The amount and type of reflective material may include a mixture of various types, or similar types with different characteristics, such as intensity of reflection, color and/or size. In addition, one or more reflective materials (18) may be injected into a helium-free balloon (1), of example, under pressure, or may be manually inserted into a helium-free balloon (1), for example by a consumer. In this embodiment, a consumer may purchase one or more translucent helium-free balloons (1) and separately choose, and/or purchase one or more reflective materials (18). In this embodiment, a consumer may add a customized amount, and type of reflective material dependent on a specific set of characteristics, such as color, reflective appearance and the like.

Generally referring to FIG. 1, in one embodiment one or more reflective materials may be combined/mixed with a translucent molding material forming a reflective molding material. In this embodiment, this reflective molding material may be inserted into a rotational mold (2), and form a internally reflective helium-free balloon where the reflective material is internally positioned throughout the helium-free balloons walls. Additional embodiments may include the injection of additional reflective material (18) into the internally reflective helium-free balloon to generate a customized color, mix of colors, or reflective properties.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish a reflective helium free balloon system and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupling method and/or technique, and/or device" and even a "means for coupling." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing a reflective helium-free balloon system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. An externally supported reflective helium-free balloon system comprising:

at least one rotational mold forming the shape of a helium-free balloon wherein said rotational mold has at least one extension configured to secure at least one internally positioned external support housing;

a quantity of translucent molding material that is distributed across a shaped internal cavity of said rotational mold and that further adheres to said external support housing;

a quantity of reflective material configured to be injected into the internal cavity of said helium-free balloon through said external support housing wherein said reflective material adheres to the internal surface of said helium-free balloon; and at least one external support secured by said external support housing.

2. An externally supported reflective helium-free balloon system as described in claim 1 wherein said reflective material comprises a reflective material selected from the group consisting of: a reflective plastic; glitter; a reflective copolymer plastics; aluminum foil; mylar; titanium dioxide coated plastic and iron oxide coated plastic; titanium dioxide coated composite; iron oxide coated composite; colored powder; a reflective dyes; powder dye; and liquid dyes.

3. An externally supported reflective helium-free balloon system as described in claim 1 wherein said reflective material configured to be injected into said rotationally molded helium-free balloon through said external support housing comprises a quantity of reflective material configured to be manually injected into said rotationally molded helium-free balloon through said external support housing.

4. An externally supported reflective helium-free balloon system as described in claim 3 wherein said quantity of reflective material configured to be manually injected into said rotationally molded helium-free balloon through said external support housing comprises a customized quantity of reflective configured to be manually injected into said rotationally molded helium-free balloon through said external support housing by a consumer to achieve a desired color and/or reflective character.

5. An externally supported reflective helium-free balloon system as described in claim 1 wherein said translucent molding material comprises a translucent molding material selected from the group consisting of: elastomeric molding material; plastic molding material; thermoplastic molding material; polyurethane (PU) molding material; thermoplastic polyurethane molding material; low-density polyethylene molding material; linear-low-density polyethylene molding material; high-density polyethylene molding material; cross-linked grades of polyethylene molding material; ethylene vinyl acetate molding material; plasticine molding material; adhesive-type polyethylene molding material; polyvinyl chloride molding material; nylon molding material; polycarbonate molding material; polyester molding material; polypropylene molding material; liquid molding material; powdered molding material; solid molding material; and resin molding material, or any hybrid of the same.

6. An externally supported reflective helium-free balloon system as described in claim 1 and further comprising at least one extension securing at least one internally positioned air insert valve housing.

7. An externally supported reflective helium-free balloon system as described in claim 6 and further comprising at least one plug secured by said air insert valve housing.

8. A helium-free balloon system comprising:

at least one rotational mold forming the shape of a helium-free balloon wherein said rotational mold has at least one extension configured to secure at least one internally positioned air insert valve housing;

a quantity of translucent molding material that is distributed across a shaped internal cavity of said rotational mold and that further adheres to said air insert valve housing;

a quantity of reflective material configured to be injected into the internal cavity of said helium-free balloon through said air insert valve housing wherein said reflective material adheres to the internal surface of said helium-free balloon;

at least one plug secured by said air insert valve housing; and at least one extension in said rotational mold securing at least one internally positioned external support housing.

9. A helium-free balloon system as described in claim 8 wherein said reflective material comprises a reflective material selected from the group consisting of: a reflective plastic; glitter; a reflective copolymer plastics; aluminum foil; mylar; titanium dioxide coated plastic and iron oxide coated plastic; titanium dioxide coated composite; iron oxide coated composite; colored powder; a reflective dyes; powder dye; and liquid dyes.

10. A helium-free balloon system as described in claim 8 wherein said reflective material configured to be injected into said rotationally molded helium-free balloon through said air insert valve housing comprises a quantity of reflective material configured to be manually injected into said rotationally molded helium-free balloon through said air insert valve housing.

11. A helium-free balloon system as described in claim 10 wherein said quantity of reflective material configured to be manually injected into said rotationally molded helium-free balloon through said air insert valve housing comprises a customized quantity of reflective configured to be manually injected into said rotationally molded helium-free balloon through said air insert valve housing by a consumer to achieve a desired color and/or reflective character.

12. A helium-free balloon system as described in claim 8 wherein said translucent molding material comprises a translucent molding material selected from the group consisting of: elastomeric molding material; plastic molding material; thermoplastic molding material; polyurethane (PU) molding material; thermoplastic polyurethane molding material; low-density polyethylene molding material; linear-low-density polyethylene molding material; high-density polyethylene molding material; cross-linked grades of polyethylene molding material; ethylene vinyl acetate molding material; plasticine molding material; adhesive-type polyethylene molding material; polyvinyl chloride molding material; nylon molding material; polycarbonate molding material; polyester molding material; polypropylene molding material; liquid molding material; powdered molding material; solid molding material; and resin molding material, or any hybrid of the same.

13. A helium-free balloon system as described in claim 8 and further comprising at least one extension securing at least one internally positioned external support housing.

14. A helium-free balloon system as described in claim 13 and further comprising at least one external support secured by said external support housing.

* * * * *